(12) United States Patent
Oi et al.

(10) Patent No.: US 7,641,848 B2
(45) Date of Patent: Jan. 5, 2010

(54) PROCESS FOR PRODUCTION OF MAGNET, MAGNET OBTAINED THEREBY AND PRODUCTION APPARATUS FOR MOLDED ARTICLES FOR MAGNET

(75) Inventors: Kazunori Oi, Chuo-ku (JP); Seiichi Endo, Chuo-ku (JP); Kazuyuki Satou, Chuo-ku (JP); Masayuki Ohtsuka, Chuo-ku (JP); Norihisa Saito, Chuo-ku (JP); Tsuneki Watanabe, Chuo-ku (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

(21) Appl. No.: 12/259,455

(22) Filed: Oct. 28, 2008

(65) Prior Publication Data

US 2009/0108970 A1    Apr. 30, 2009

(30) Foreign Application Priority Data

Oct. 30, 2007    (JP)    ............................ P2007-282081

(51) Int. Cl.
  *B29C 45/00*    (2006.01)
(52) U.S. Cl. ............................... 264/611; 425/DIG. 33; 264/427
(58) Field of Classification Search ......... 264/427–429, 264/611–613; 425/3, 78, DIG. 33; 419/38–40
See application file for complete search history.

(56) References Cited

U.S. PATENT DOCUMENTS

2007/0069426 A1*    3/2007    Kurita et al. ................. 264/428

FOREIGN PATENT DOCUMENTS

JP    2006-253526    9/2006
WO    WO 9213692 A1 *    8/1992

* cited by examiner

*Primary Examiner*—Ramon M Barrera
(74) *Attorney, Agent, or Firm*—Drinker Biddle & Reath LLP

(57) ABSTRACT

A process for production of a magnet which comprises step of supplying a slurry S containing magnetic powder and a dispersing medium into the cavity C of a molding apparatus 12, a step of compression molding the slurry S while applying a magnetic field to the slurry S to obtain a molded article and a step of sintering the molded article to obtain a magnet, wherein the molding apparatus 12 comprises a die 121 having a through-hole 121*a* into which the slurry S is supplied, a slurry supply gate 121*d* being formed in the inner wall surface 121*b*, a die 122 inserted in the through-hole 121*a* and a die 123 that forms a cavity C together with the dies 123, 122, the slurry S being supplied in an amount such that it is less than the volume of the cavity C when the die 122 has been inserted in the through-hole 121*a* and has blocked the slurry supply gate 121*d*, and in the step of obtaining the molded article, the slurry S is compression molded after the die 122 has blocked the slurry supply gate 121*d*.

6 Claims, 4 Drawing Sheets

PROCESS FOR PRODUCTION OF MAGNET, MAGNET OBTAINED THEREBY AND PRODUCTION APPARATUS FOR MOLDED ARTICLES FOR MAGNET

BACKGROUND OF THE INVENTION

1. Field of the Invention

The present invention relates to a process for production of a magnet, a magnet obtained thereby and a production apparatus for molded articles for magnets.

2. Related Background Art

Ferrite magnets are widely used in various fields including automobiles, household electrical appliances and industrial equipment because of their excellent properties and relatively low cost.

For production of a ferrite magnet, first a mixture of starting materials in a prescribed mixing ratio is calcined to obtain a calcined ferritized body, and then the calcined body is pulverized to the submicron size to obtain finely pulverized powder composed of ferrite particles. The finely pulverized powder is then subjected to compression molding in a magnetic field to obtain a molded article, and the molded article is sintered. This process yields a ferrite magnet.

Such molding processes are largely classified as dry molding wherein the finely pulverized powder is molded after drying, or wet molding in which the finely pulverized powder is prepared as a slurry before molding, with wet molding being preferred for a greater degree of magnetic orientation.

Processes for production of magnets by wet molding are known, such as described in Japanese Patent Laid-open No. 2006-253526, for example. The magnet production process described in the aforementioned publication employs a molding apparatus comprising a mortar die with a through-hole, a drag that is inserted into the through-hole of the mortar die and a cope which forms a cavity by sealing the through-hole together with the drag, wherein a slurry supply gate for supply of slurry is formed in the inner wall surface surrounding the through-hole of the mortar die. The slurry supplied to the mortar die with a pump is fed into the cavity through the slurry supply gate.

In this magnet production process, the slurry supplied to the mortar die by the pump is fed into the cavity through the slurry supply gate causing the cavity to become filled with the slurry, after which the drag is moved to accomplish compression molding of the slurry while blocking the slurry supply gate, to obtain a molded article.

SUMMARY OF THE INVENTION

With increasingly smaller and thinner sizes of ferrite magnets in recent years, demand has arisen for smaller thicknesses of the molded articles as well.

However, the magnet production process described in Patent document 1 is associated with the following problems when attempting to obtain thin molded articles.

Specifically, in order to obtain a thin molded article it is necessary to ensure a sufficient compression stroke by the drag after the slurry supply gate has been blocked. However, since the cavity is filled with slurry, the drag may be unable to accomplish a sufficient compression stroke causing the slurry to become compression molded before the slurry supply gate has been blocked. Consequently, the dispersing medium that has been squeezed out by the compression flows into the slurry supply gate, thus increasing the concentration of the dispersing medium nearer to the slurry supply gate. In other words, the concentration of magnetic powder is lower nearer the slurry supply gate. As a result, density variation is created in the obtained molded article, and the magnet obtained by firing the molded article is therefore prone to structural deficiencies such as cracks, chipping and splitting. In addition, a difference in shrinkage factor is produced by the density variation in the molded article, and this tends to cause deformation during firing of the molded article and to create structural deficiencies in the obtained magnet. Therefore, with the magnet production process described in Patent document 1 it has been difficult to produce magnets that are resistant to structural deficiencies, even with small thicknesses.

It is possible to produce magnets that are resistant to structural deficiencies even with small thicknesses by producing a thick molded article by the aforementioned magnet production process and sintering it, and then polishing the sintered compact. When this is done, however, the sintered compact must be thoroughly polished, resulting in significant loss of the material.

This problem is not limited to ferrite magnets, and occurs even during production of magnets other than ferrite magnets, such as rare earth magnets.

The present invention has been accomplished in light of these circumstances, and its object is to provide a process for production of a magnet that allows production of magnets with minimal material loss and with resistance to structural deficiencies even when formed to small thicknesses, as well as to provide a magnet obtained by the process and a production apparatus for molded articles for magnets.

[Means for Solving the Problems]

In order to solve the aforementioned problems, the invention provides a process for production of a magnet which comprises a slurry supplying step in which a slurry containing a magnetic powder and a dispersing medium is supplied into the cavity of a molding apparatus, a molding step in which the slurry is subjected to compression molding while applying a magnetic field to the slurry to obtain a molded article and a sintering step in which the molded article is sintered to obtain a magnet, wherein the molding apparatus comprises a first die having a through-hole into which the slurry is supplied and a slurry supply gate which supplies the slurry formed in the inner wall surface surrounding the through-hole, a second die inserted in the through-hole and a third die that forms a cavity by sealing the through-hole together with the second die, wherein the slurry is supplied in an amount such that it is less than the volume of the cavity when the second die has been inserted in the through-hole of the first die and has blocked the slurry supply gate, and in the molding step, the slurry is compression molded after the second die has blocked the slurry supply gate.

Since the slurry is supplied in an amount such that it is less than the volume of the cavity when the second die blocks the slurry supply gate in the slurry supplying step of the magnet production process of the invention, it is possible to accomplish compression molding of the slurry after the second die has blocked the slurry supply gate. That is, because the second die is blocking the slurry supply gate during compression molding of the slurry, the slurry does not undergo reverse flow toward the slurry supply gate, and the concentration of the dispersing medium in the slurry inside the cavity is not increased nearer the slurry supply gate. Consequently, variation in the slurry concentration inside the cavity is prevented even when thin molded articles are formed, thus helping to prevent density variation in the obtained molded articles, so that magnets obtained by sintering them are resistant to structural deficiencies such as cracking, chipping and splitting. In addition, the difference in shrinkage factor produced by density variation in the molded article is minimized, thus helping to prevent deformation during firing of the molded article and resulting in fewer structural deficiencies in the obtained magnet. It is therefore possible to minimize the area that requires polishing of the sintered compact, which is obtained by sintering the molded article. According to the magnet production process of the invention, it is possible to obtain a magnet that is resistant to structural deficiencies even when having a small thickness, while exhibiting minimal loss of material. Furthermore, since the slurry does not undergo reverse flow, there is no need for a shutoff valve to prevent reverse flow of the slurry into the slurry supply gate.

In addition, since compression molding of the slurry is carried out after the second die has blocked the slurry supply gate of the first die, the slurry that remains in the slurry supply gate after the slurry supply gate has been blocked by the second die is not compressed. As a result, it is possible to prevent jetting of the slurry from the slurry supply gate when the molded article is removed from the molding apparatus and the second die is subsequently moved to open the slurry supply gate of the first die. This eliminates the need for cleaning of the die due to jetting of the slurry. Production efficiency can therefore be significantly improved when multiple magnets are produced. The need to provide equipment such as a residual pressure treatment device to prevent jetting of the slurry is also eliminated.

Moreover, since it is possible to accomplish compression molding of the slurry after the second die has blocked the slurry supply gate in the magnet production process of the invention, the aperture of the slurry supply gate can be increased in size. As a result, it is possible to inhibit clogging of the slurry and variation in slurry supply volume, while also shortening the slurry supply time.

In the slurry supplying step, the slurry is preferably supplied into the cavity in a metered amount. This will permit variation in magnet weight to be reduced when multiple magnets are fabricated.

The invention further provides a magnet produced by the magnet production process described above. According to the invention, it is possible to realize a magnet that is resistant to structural deficiencies such as cracking, chipping and splitting even when thin. A magnet according to the invention can be obtained at reduced cost since material loss in the production process is minimized. The invention can further provide, for example, lamellar magnets having thicknesses of less than 4 mm.

The invention still further provides a production apparatus for a molded article for magnets, which comprises a molding apparatus with a cavity and a slurry supply apparatus that supplies the slurry into the cavity, wherein the molding apparatus comprises a first die having a through-hole into which the slurry is supplied and having a slurry supply gate which supplies the slurry formed in the inner wall surface surrounding the through-hole, a second die inserted in the through-hole and a third die that forms a cavity by sealing the through-hole together with the second die, wherein the slurry supply apparatus supplies the slurry in an amount such that it is less than the volume of the cavity when the second die has blocked the slurry supply gate of the first die.

According to this production apparatus for a molded article for magnets, the slurry supply apparatus supplies the slurry in an amount such that it is less than the volume of the cavity when the second die has blocked the slurry supply gate. Consequently, as in the magnet production process described above, variation in the slurry concentration inside the cavity is minimized even with thin molded articles are obtained, thus helping to prevent density variation in the obtained molded article. The difference in shrinkage factor of the molded article due to density variation is also reduced. As a result, it is possible to obtain a molded article that is resistant to deformation during firing.

Moreover, since compression molding of the slurry is carried out after the second die has blocked the slurry supply gate of the first die, it is possible, as according to the magnet production process described above, to prevent jetting of the slurry from the slurry supply gate when the molded article is removed from the molding apparatus and the second die is subsequently moved to open the slurry supply gate of the first die. This eliminates the need for cleaning of the die that is required due to jetting of the slurry, and can significantly improve production efficiency when multiple magnets are produced. The need for providing equipment such as a residual pressure treatment device to prevent jetting of the slurry is also eliminated.

Moreover, it is possible to accomplish compression molding of the slurry after the second die has blocked the slurry supply gate in the production apparatus for a molded article for magnets according to the invention. As a result, similar to the magnet production process described above, it is possible to inhibit clogging of the slurry and variation in slurry supply volume, while also shortening the slurry supply time.

In the production apparatus for a molded article for magnets as described above, the slurry supply apparatus preferably comprises metered supply means for supply of a metered amount of slurry into the cavity. The supply of a metered amount of slurry into the cavity by the metered supply means will permit variation in magnet weight to be reduced when multiple magnets are fabricated.

According to the invention, the phrase "when the second die has been inserted in the through-hole of the first die and has blocked the slurry supply gate" refers to the point where the slurry supply gate has been completely blocked by the second die and movement of the slurry between the slurry supply gate and cavity has been cut off.

According to the invention there is provided a process for production of a magnet that allows production of magnets with minimal material loss and with resistance to structural deficiencies even when formed to small thicknesses, as well as a magnet obtained by the process and a production apparatus for molded articles for magnets.

DESCRIPTION OF THE PREFERRED EMBODIMENTS

Figure 1:
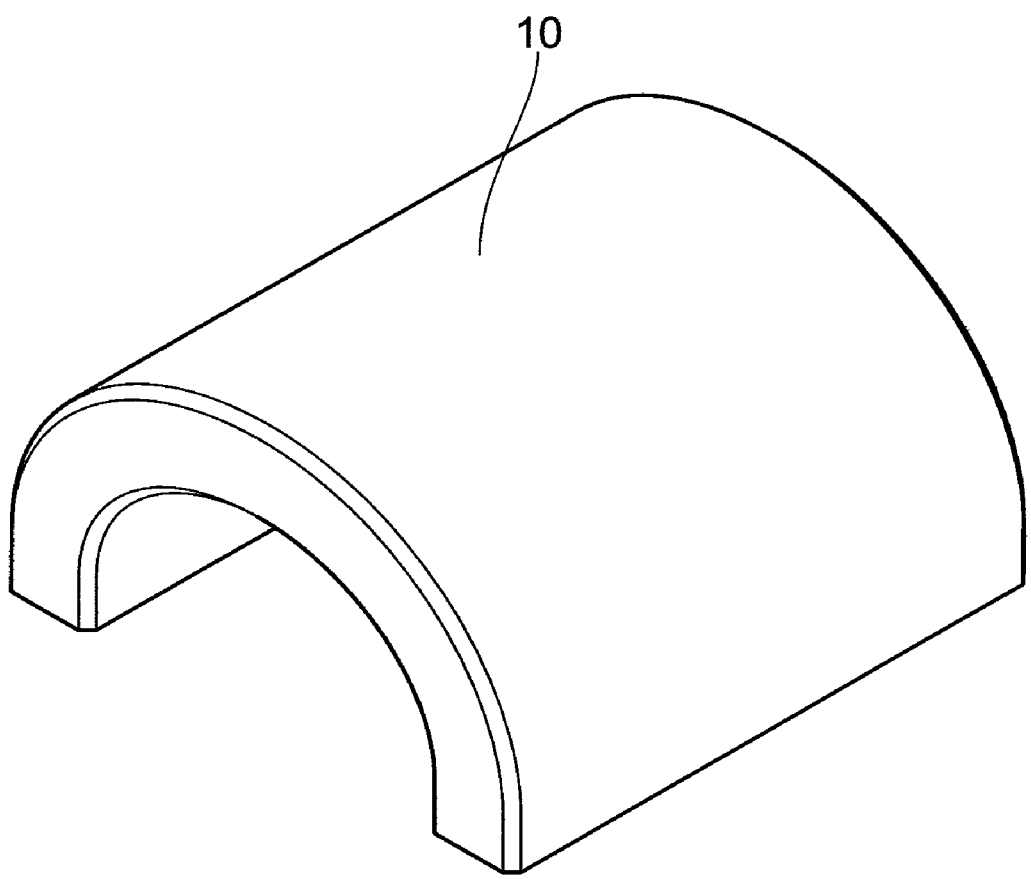
FIG. 1 is a perspective view of an embodiment of a magnet according to the invention.

Embodiments of the invention will now be described.
[Magnet]
FIG. 1 is a perspective view showing a ferrite sintered magnet as an example of a magnet produced by the magnet production process of the invention. The ferrite sintered magnet 10 shown in FIG. 1 is a lamellar body with an arcuate cross-section, and is produced by the magnet production process described below The shape of the ferrite sintered magnet is not limited to this one, and it may instead be a lamellar body with a rectangular cross-section. The thickness of the ferrite sintered magnet 10 is not particularly restricted and may be, for example, 4 mm or smaller.

[Magnet Production Process]

The process for production of the ferrite sintered magnet 10 will now be explained.

For production of the ferrite sintered magnet 10, first the starting materials for formation of the ferrite sintered magnet 10 are combined in the prescribed mixing ratio and the mixture is calcined and ferritized to obtain a calcined body. As starting materials there may be mentioned metal oxides and compounds that are converted to oxides by firing, such as hydroxides or salts (carbonic acid salts, nitric acid salts and the like).

The calcination is preferably carried out in an oxidizing atmosphere such as air, for example. The calcination temperature may be, for example, 1100-1450° C.

Since the calcined body itself may be granular or aggregated and is difficult to mold as explained hereunder, the calcined body is preferably pulverized to produce a magnetic powder of the desired particle size. Specifically, the calcined granules or the aggregated calcined body is subjected to coarse grinding followed by fine grinding, to prepare a magnetic powder with a suitable particle size. This produces a finely ground magnetic powder. The coarse grinding may be carried out using a known grinding apparatus such as for example, a vibrating mill. The fine grinding may also be carried out on the coarsely ground calcined body using a known grinding apparatus such as, for example, a wet attritor, ball mill, jet mill or the like.

Next, the finely ground magnetic powder and dispersing medium are mixed to obtain a slurry containing the magnetic powder and dispersing medium. The slurry is preferably one containing the powder at about 30-80 wt %. Water is preferred as the dispersing medium, but a surfactant such as gluconic acid and/or a gluconic acid salt or sorbitol may also be included in addition to the water. The dispersing medium is not limited to water and may instead be a nonaqueous dispersing medium. As examples of nonaqueous dispersing media there may be mentioned organic solvents such as toluene or xylene. When a nonaqueous dispersing medium is used, the dispersing medium preferably contains a surfactant such as oleic acid.

The slurry is then supplied into the cavity of the molding apparatus (slurry supplying step).

The slurry is subjected to compression molding while applying a magnetic field to the slurry, to obtain a molded article (molding step). The molding pressure for wet molding is, for example, 0.1-0.5 ton/cm$^2$ and the applied magnetic field is, for example, 5-15 kOe.

The molded article obtained in this manner is fired to obtain a sintered compact. A ferrite sintered magnet 10 comprising the sintered compact is thus obtained (sintering step). The firing may be carried out in an oxidizing atmosphere such as air.

From the viewpoint of obtaining a ferrite sintered magnet 10 with suitable magnetic properties, the firing temperature is preferably 1100-1220° C. and more preferably 1140-1200° C.

Figure 2:
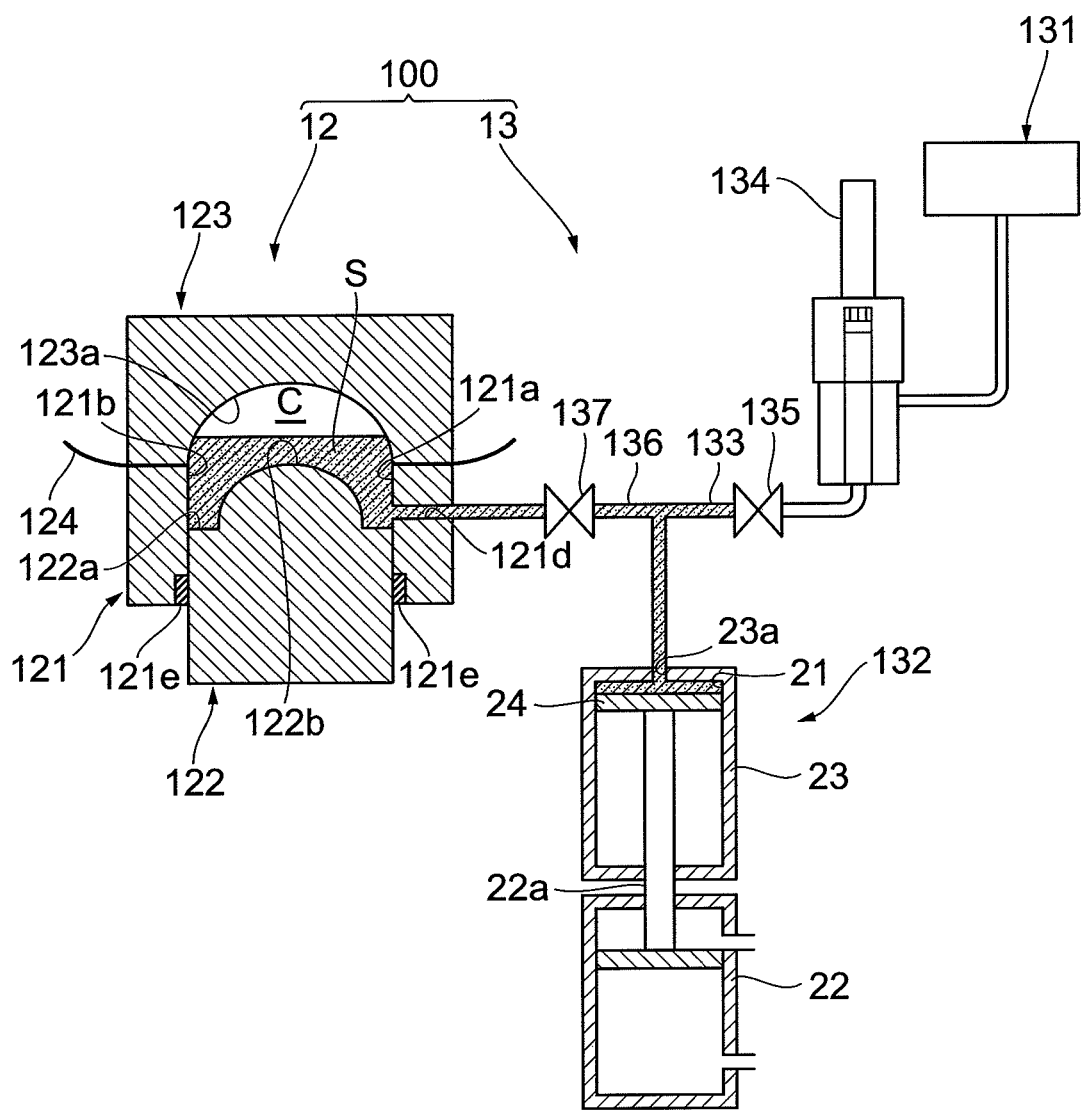
FIG. 2 is a schematic diagram of a slurry supplying step in which slurry is supplied into the cavity of a molding apparatus, using the example of a production apparatus for a molded article for magnets according to the invention.
Figure 3:
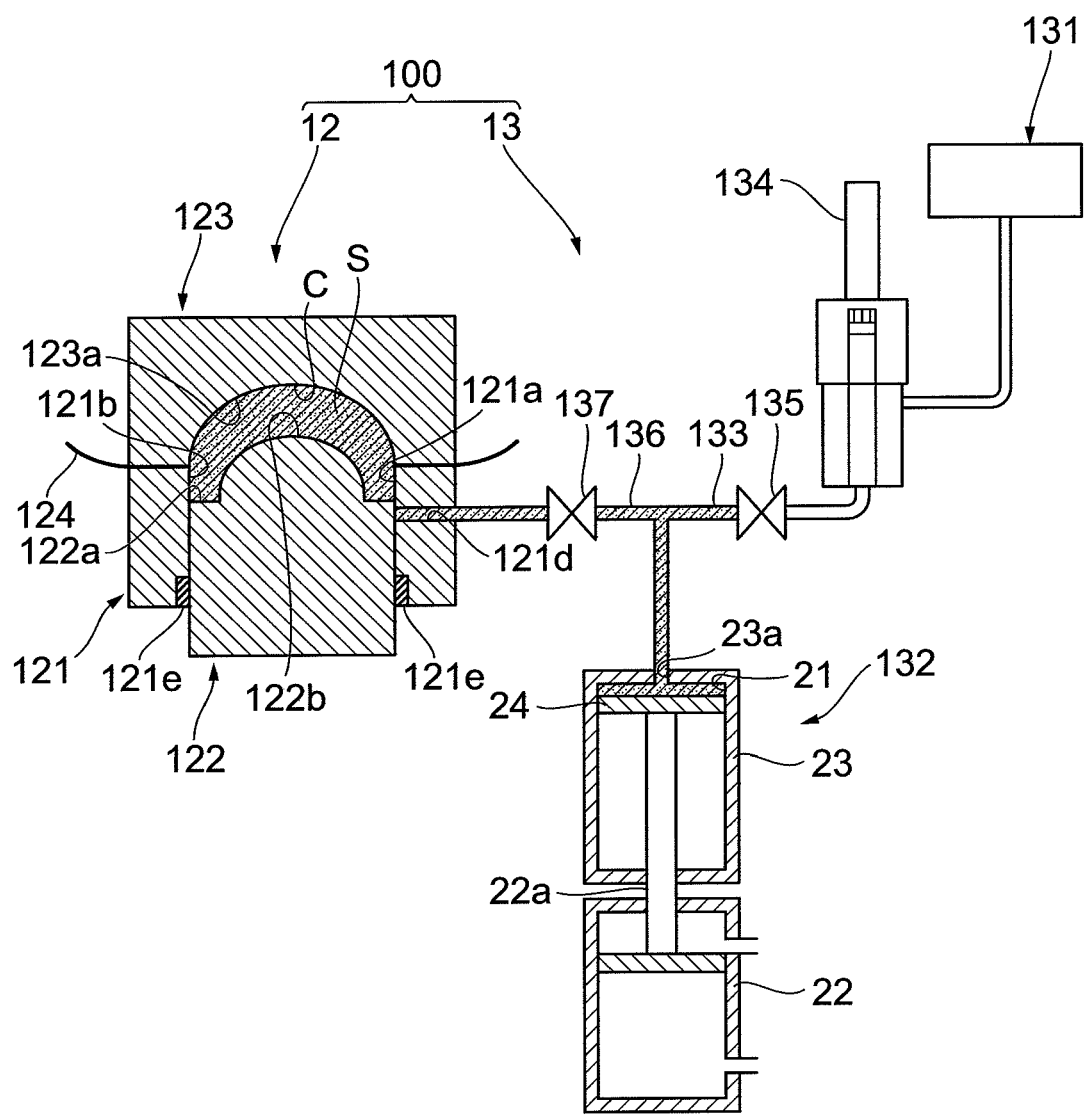
FIG. 3 is a schematic diagram of a molding step which accomplishes compression molding of slurry that has been supplied into the cavity of a molding apparatus using the production apparatus for a molded article for magnets shown in FIG. 2.
Figure 4:
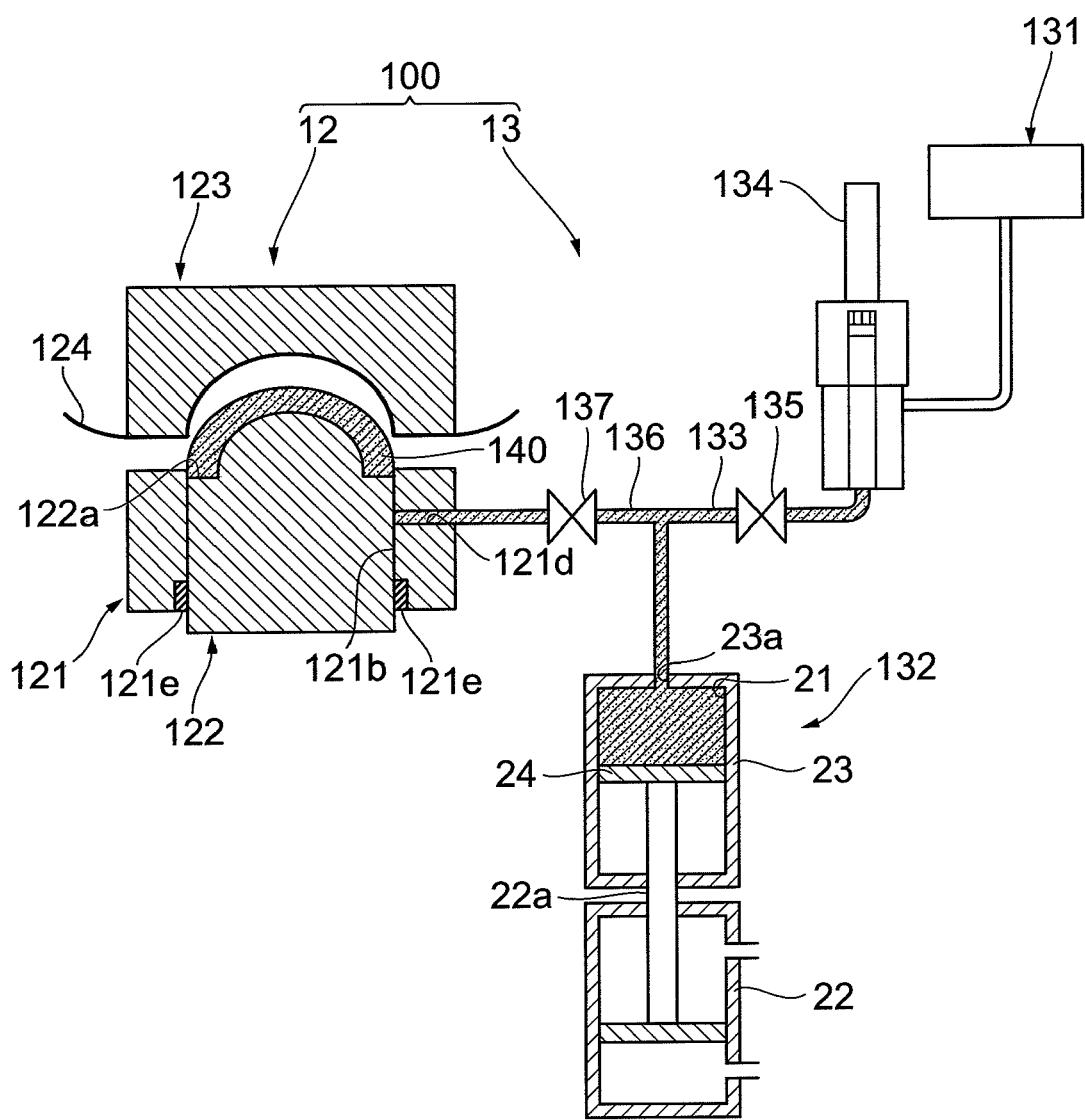
FIG. 4 is a schematic diagram of a step of removing a molded article obtained by a molding apparatus using the production apparatus for a molded article for magnets shown in FIG. 2.

FIGS. 2 to 4 are schematic diagrams showing examples of production apparatuses for a molded article for magnets according to the invention. FIG. 2 shows the slurry supplying step in which the slurry is supplied into the molding apparatus. FIG. 3 shows the molding step in which the slurry supplied into the molding apparatus is subjected to compression molding. FIG. 4 shows the step of removing the molded article obtained by the compression molding.

As shown in FIGS. 2 to 4, the production apparatus 100 for a molded article for magnets comprises a molding apparatus 12 with a cavity C, a slurry supply apparatus 13 which supplies the slurry to the molding apparatus 12, and a magnetic field-applying device (not shown) which applies a magnetic field to the slurry S in the cavity C.

The molding apparatus 12 comprises a mortar die (first die) 121 with a through-hole 121a through which the slurry S is supplied, a drag (second die) 122 inserted in the through-hole 121a and a cope (third die) 123 that forms a cavity C by sealing the through-hole 121a together with the drag 122.

The mortar die 121 has an inner wall surface 121b that surrounds the through-hole 121a and an outer wall surface 121c that surrounds the inner wall surface 121b, and a slurry supply gate 121d is formed in the inner wall surface 121b for supply of the slurry S. The slurry supply gate 121d is formed running through the inner wall surface 121b and outer wall surface 121c.

The cavity C is formed by the lower compression surface 122a on the cope 123 side of the drag 122, the upper compression surface 123a on the drag 122 side of the cope 123, and the inner wall surface 121b of the mortar die 121.

A protrusion 122b is formed on the lower compression surface 122a of the drag 122, while the upper compression surface 123a of the cope 123 forms a concave section 123b, thereby producing an arcuate cross-sectional shape in the obtained molded article 140.

A colation cloth 124 is inserted between the cope 123 and mortar die 121 to remove the dispersing medium in the slurry S. A sealing member 121e is provided in the inner wall surface 121b of the mortar die 121 to seal the gap with the drag 122.

The slurry supply apparatus 13 mainly comprises a slurry reservoir 131 which holds the slurry S, and a metering pump 132 for metered supply of the slurry S through the slurry supply gate 121d into the cavity C of the molding apparatus 12. The slurry reservoir 131 and metering pump 132 are connected by a first slurry supply line 133, and the first slurry supply line 133 includes a main pump 134 and valve 135 situated in that order from the slurry reservoir 131 toward the metering pump 132. A second slurry supply line 136 branches from the first slurry supply line 133 at a location between the valve 135 and metering pump 132, and is connected to the slurry supply gate 121d. A valve 137 is also situated in the second slurry supply line 136.

The metering pump 132 communicates with the inside of the first slurry supply line 133, and comprises a volume-variable chamber 21 and a driving mechanism 22 that varies the volume of the chamber 21. The chamber 21 is formed by a tubular cylinder 23 and a piston 24 provided in a reciprocatable manner along one direction inside the cylinder 23. The cylinder 23 communicates with the interior of the first slurry supply line 133 via a communicating tube 23a.

The driving mechanism 22 is composed of an extensible cylinder that operates by air pressure or oil pressure, for example, and the piston 24 is connected to the end of the operating rod 22a of the driving mechanism 22. Operation of the driving mechanism 22 by air pressure or oil pressure pushes or pulls the operating rod 22a, causing the piston 24 to move in the cylinder 23. Movement of the piston 24 allows the volume of the chamber 21 to be varied. The driving mechanism 22 is not limited to an extensible cylinder and may be any other suitable mechanism so long as it allows the piston 24 to move in the cylinder 23.

Operation of the driving mechanism 22 is controlled by a controller (not shown) in the slurry supply apparatus 13. Specifically, the controller controls the driving mechanism 22 so that the slurry S is supplied into the cavity C through the slurry supply gate 121d, in an amount less than the volume of the cavity C when the drag 122 has blocked the slurry supply gate 121d. According to this embodiment, the driving mechanism 22 controls the degree of movement of the operating rod 22a so that, based on the volume of the cavity C when the drag 122 has blocked the slurry supply gate 121d, an amount of slurry less than that volume is supplied into the cavity C through the slurry supply gate 121d.

The metering pump is not limited to a plunger-type pump as for this embodiment, and any other suitable pump may be applied, such as a gear pump, screw pump or Mohno pump.

A process for production of a molded article using the production apparatus 100 for a molded article for magnets will now be described.

First, as shown in FIG. 2, the main pump 134 is operated with the valve 137 closed and the valve 135 open, thus supplying the slurry S from the slurry reservoir 131 to the metering pump 132 through the first slurry supply line 133. The volume of the chamber 21 increases at the metering pump 132 as the cylinder 24 retracts by the driving mechanism 22. The slurry S is thus introduced into the chamber 21.

Next, the valve 135 is closed and the valve 137 opened, while the drag 122 is set at a position with respect to the mortar die 121 so that the slurry supply gate 121d is open (that is, a position such that it is not blocked). In this state, the operating rod 22a is operated by the driving mechanism 22 causing the slurry S to be pushed out of the chamber 21 by the piston 24, thus supplying the slurry S to the cavity C of the molding apparatus 12 via the communicating tube 23a, first slurry supply line 133, second slurry supply line 136 and slurry supply gate 121d. Here, the driving mechanism 22 controls the degree of movement of the operating rod 22a so that, based on the volume of the cavity C when the drag 122 has blocked the slurry supply gate 121 d, an amount of slurry less than that volume is supplied into the cavity C through the slurry supply gate 121d. That is, the slurry S is supplied in an amount so that it is less than the volume of the cavity C when the drag 122 has blocked the slurry supply gate 121d. Therefore, the slurry S is not compressed at this point.

Next, the drag 122 is moved toward the cope 123 and the slurry supply gate 121d is blocked by the drag 122 (FIG. 3). At this time, the slurry S has been supplied in an amount so that it is less than the volume of the cavity C when the drag 122 has blocked the slurry supply gate 121d. The slurry S can be compression molded by subsequently moving the drag 122 toward the cope 123. A magnetic field is also applied to the slurry S at this time from the magnetic field-applying device. This procedure produces a molded article 140.

After the molded article 140 has been obtained in this manner, the cope 123 is separated from the mortar die 121 and the drag 122 may be moved further upward to eject the molded article 140 (FIG. 4). The ejected molded article 140 is then fired as described above to produce a sintered compact. A ferrite sintered magnet 10 is thus obtained. The sintered compact may be subjected to polishing and the like if necessary. In this case, the polished sintered compact will be the ferrite sintered magnet 10. Since the ferrite sintered magnet of this embodiment is resistant to structural deficiencies even when thin, the areas requiring polishing are reduced even if the sintered compact is polished, and therefore material loss can be adequately minimized.

Thus, since the slurry supply gate 121d is blocked by the drag 122 during compression molding of the slurry S according to this embodiment, the concentration of the dispersing medium in the slurry S inside the cavity C is not increased nearer the slurry supply gate 121d. Consequently, variation in the concentration of the slurry S inside the cavity C is prevented even when thin molded articles are produced, thus helping to prevent density variation in the obtained molded article, so that ferrite sintered magnet 10 obtained by sintering it is resistant to structural deficiencies such as cracking, chipping and splitting. In addition, the difference in shrinkage factor produced by density variation in the molded article is minimized, thus helping to prevent deformation during firing of the molded article and resulting in fewer structural deficiencies in the obtained ferrite sintered magnet 10. It is therefore possible to minimize the need for grinding of the sintered compact which is obtained by sintering the molded article.

By the process for production of a ferrite sintered magnet 10 according to this embodiment, it is possible to obtain a ferrite sintered magnet 10 that is resistant to structural deficiencies even when having a small thickness, while exhibiting minimal loss of material.

In addition, since compression molding of the slurry S is carried out after the drag 122 has blocked the slurry supply gate 121d of the mortar die 121, the slurry S that remains in the slurry supply gate 121d after the slurry supply gate 121d has been blocked by the drag 122 is not compressed. As a result, it is possible to prevent jetting of the slurry S from the slurry supply gate 121d after the molded article has been ejected from the molding apparatus 12 and the drag 122 that is to be used for production of the next molded article is moved to open the slurry supply gate 121d of the mortar die 121. This eliminates the need for cleaning of the die due to jetting of the slurry S. Production efficiency can therefore be significantly improved when multiple ferrite sintered magnets 10 are produced.

The need for providing equipment such as a residual pressure treatment device to prevent jetting of the slurry S is also eliminated.

Moreover, since it is possible to accomplish compression molding of the slurry S after the drag 122 has blocked the slurry supply gate 121d in the process for production of a ferrite sintered magnet 10 according to this embodiment, the aperture of the slurry supply gate 121d can be increased. As a result, it is possible to inhibit clogging of the slurry S and variation in slurry supply volume, while also shortening the slurry supply time.

Moreover, since the slurry S is supplied in a metered amount into the cavity C by the metering pump 132 according to this embodiment, it is possible to reduce variation in weight of ferrite sintered magnets 10 when multiple ferrite sintered magnets 10 are produced.

The invention is not limited to the embodiment described above. For example, a process for production of a ferrite sintered magnet was described for this embodiment, but the magnet production process of the invention may also be applied for production of magnets other than ferrite sintered magnets, such as rare earth sintered magnets.

Also, according to the embodiment described above, the slurry S is introduced from the slurry reservoir 131 into the metering pump 132 by the main pump 134 and then supplied from the metering pump 132 into the cavity C of the molding apparatus 12 via the slurry supply gate 121d, but a known metering pump may be used instead of the main pump 134, and the metering pump 132 may be omitted. This will allow the size of the production apparatus 100 for a molded article for magnets to be reduced.

EXAMPLES

The present invention will now be explained in greater detail based on examples and comparative examples, with the understanding that the invention is not limited to the examples.

Example 1

A ferrite sintered magnet with a composition represented by $Sr_{0.82}La_{0.18}Co_{0.15}Fe_{11.8}O_{19}$ was formed in the following manner. First, $Fe_2O_3$ and $SrCO_3$ were combined as starting materials and the mixture was ferritized by calcination at 1200° C. for 0.5 hour in air to obtain a calcined body.

The calcined body was then coarsely ground with a roller mill and subsequently subjected to fine grinding with an attritor to obtain a finely ground magnetic powder.

Next, the finely ground magnetic powder was mixed with water and $CaCO_3$, $SiO_2$, $La(OH)_3$ and $Co_3O_4$ to obtain a slurry containing the magnetic powder and water. The concentration of the magnetic powder was 76 wt %.

The slurry obtained in this manner was supplied into the cavity C of the molding apparatus 12 shown in FIG. 2. The volume of the cavity C was 8.8 cm³ when the drag 122 had been inserted into the through-hole 121a of the mortar die 121 to block the slurry supply gate 121d. At this time, the controller was used to control the driving mechanism 22 based on the volume of the cavity C, so that the amount of slurry S supplied into the cavity C was 6.3 cm³, which was less than that volume. Specifically, the controller was used to control the degree of movement of the operating rod 22a via the driving mechanism 22, so that the amount of slurry S supplied into the cavity C was 6.3 cm³, which was less than the aforementioned volume.

The slurry was then subjected to compression molding at a pressure of 0.5 ton/cm² while applying a magnetic field of 12 kOe to the slurry, to obtain a lamellar molded article with an arcuate cross-section. The molded article was lamellar with an arcuate cross-section, and its thickness was 3.91 mm.

The molded article obtained in this manner was fired at 1200° C. for 1.0 hour in air to obtain a sintered compact with a thickness of 3.0 mm. In order to obtain a ferrite sintered magnet with a thickness of 2.0 mm, the surface of the sintered compact was polished with a grinding allowance of 1.0 mm using a diamond grinding stone.

Example 2

A sintered compact was obtained as a lamellar body with an arcuate cross-section in the same manner as Example 1, except that the thickness of the molded article was 3.0 mm and the supply volume of the slurry to the cavity C was 4.8 cm³. The thickness of the sintered compact was 2.3 mm. In order to obtain a ferrite sintered magnet with a thickness of 2.0 mm, the surface of the sintered compact was polished with a grinding allowance of 0.3 mm.

Comparative Example 1

A sintered compact was obtained in the same manner as Example 1, except that compression molding of the slurry was carried out while blocking the slurry supply gate 121d, after supplying the slurry until the cavity C was filled with slurry. The volume of the slurry supplied to the cavity C was 9.3 cm³. The thickness of the sintered compact was 5.0 mm. In order to obtain a ferrite sintered magnet with a thickness of 2.0 mm, the surface of the sintered compact was polished with a grinding allowance of 3.0 mm.

The ferrite sintered magnets of Examples 1 and 2 and Comparative Example 1 were visually examined and the presence of any structural deficiencies such as cracks and chipping was observed. As a result, no structural deficiencies such as cracking or chipping were found in any of the ferrite sintered magnets of Examples 1 and 2 and Comparative Example 1. Also, the proportion of the grinding allowance with respect to the thickness of the ferrite sintered magnet (grinding ratio) was calculated for each of the ferrite sintered magnets of Examples 1 and 2 and Comparative Example 1. The results are shown in Table 1.

TABLE 1

|  | Grinding ratio (%) |
| --- | --- |
| Example 1 | 33 |
| Example 2 | 13 |
| Comparative Example 1 | 60 |

The results shown in Table 1 indicate that the ferrite sintered magnets of Examples 1 and 2 had sufficiently low grinding ratios and reduced material loss, compared to the ferrite sintered magnet of Comparative Example 1.

Thus, it was confirmed that the magnet production process of the invention can produce a magnet that is resistant to structural deficiencies even when having a small thickness, while exhibiting minimal loss of material.

What is claimed is:

1. A process for production of a magnet which comprises
    a slurry supplying step in which a slurry containing a magnetic powder and a dispersing medium is supplied into the cavity of a molding apparatus,
    a molding step in which the slurry is subjected to compression molding while applying a magnetic field to the slurry to obtain a molded article and
    a sintering step in which the molded article is sintered to obtain a magnet,
wherein the molding apparatus comprises a first die having a through-hole into which the slurry is supplied, a slurry supply gate which supplies the slurry being formed in the inner wall surface surrounding the through-hole, a second die inserted in the through-hole and a third die that forms a cavity by sealing the through-hole together with the second die, the slurry being supplied in an amount such that it is less than the volume of the cavity when the second die has been inserted in the through-hole of the first die and has blocked the slurry supply gate, and
    in the molding step, the slurry is compression molded after the second die has blocked the slurry supply gate.

2. A process for production of a magnet according to claim 1, wherein in the slurry supplying step, the slurry is supplied in a metered amount into the cavity.

3. A production apparatus for a molded article for magnets, which comprises
    a molding apparatus with a cavity and
    a slurry supply apparatus that supplies a slurry comprising magnetic powder and a dispersing medium into the cavity, wherein the molding apparatus comprises a first die having a through-hole into which the slurry is supplied and having a slurry supply gate which supplies the slurry formed in the inner wall surface surrounding the through-hole, a second die inserted in the through-hole and a third die that forms a cavity by sealing the through-hole together with the second die, wherein the slurry supply apparatus supplies the slurry in an amount such that it is less than the volume of the cavity when the second die has blocked the slurry supply gate of the first die.

4. A production apparatus for a molded article for magnets according to claim 3, wherein the slurry supply apparatus comprises metered supply means for supply of a metered amount of slurry into the cavity.

5. A magnet produced by a process for production of a magnet according to claim 1.

6. A magnet according to claim 5, which has a lamellar shape and a thickness of no greater than 4 mm.

* * * * *